United States Patent
Yamato et al.

(10) Patent No.: US 11,469,463 B2
(45) Date of Patent: Oct. 11, 2022

(54) CYLINDRICAL BATTERY

(71) Applicant: Panasonic Intellectual Property Management Co., Ltd., Osaka (JP)

(72) Inventors: Kenji Yamato, Osaka (JP); Tadayoshi Takahashi, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 307 days.

(21) Appl. No.: 16/960,032

(22) PCT Filed: Sep. 21, 2018

(86) PCT No.: PCT/JP2018/035063
§ 371 (c)(1),
(2) Date: Jul. 3, 2020

(87) PCT Pub. No.: WO2019/163180
PCT Pub. Date: Aug. 29, 2019

(65) Prior Publication Data
US 2020/0350521 A1    Nov. 5, 2020

(30) Foreign Application Priority Data
Feb. 20, 2018    (JP) ............................. JP2018-028065

(51) Int. Cl.
*H01M 50/107*    (2021.01)
*H01M 50/166*    (2021.01)

(52) U.S. Cl.
CPC ....... *H01M 50/107* (2021.01); *H01M 50/166* (2021.01)

(58) Field of Classification Search
None
See application file for complete search history.

(56) References Cited

U.S. PATENT DOCUMENTS

| | | | |
|---|---|---|---|
| 6,265,096 B1* | 7/2001 | Tucholski | H01M 50/182 |
| | | | 429/185 |
| 2002/0032959 A1* | 3/2002 | Malay | H01M 50/154 |
| | | | 429/185 |

FOREIGN PATENT DOCUMENTS

| | | |
|---|---|---|
| JP | 2002-523875 | 7/2002 |
| WO | 2000/011733 | 3/2000 |

OTHER PUBLICATIONS

International Search Report of PCT application No. PCT/JP2018/035063 dated Dec. 25, 2018.

* cited by examiner

*Primary Examiner* — Haixia Zhang
(74) *Attorney, Agent, or Firm* — McDermott Will & Emery LLP

(57) ABSTRACT

A cylindrical battery including a battery case and a lid, the battery case having an opening doubly wound and tightened to be sealed by an outer peripheral portion of the lid, wherein an opening-side outer peripheral portion of the battery case has a diameter reduced inward in the radial direction, an outer peripheral surface of the battery case is covered with a label, a space surrounded by the outer peripheral surface of the battery case, the outer peripheral portion of the lid, and the label is provided, and $1.2 \times T1 \leq D \leq 2.7 \times T1$ is satisfied in a range of $0.1 \text{ mm} \leq T1 \leq 0.5 \text{ mm}$, where D is a diameter of an inscribed circle that is tangent to the outer peripheral surface of the battery case, the outer peripheral portion of the lid, and the label, and T1 is a thickness of the battery case.

2 Claims, 6 Drawing Sheets

CYLINDRICAL BATTERY

CROSS-REFERENCE TO RELATED APPLICATIONS

This application is a U.S. national stage application of the PCT International Application No. PCT/JP2018/035063 filed on Sep. 21, 2018, which claims the benefit of foreign priority of Japanese patent application 2018-028065 filed on Feb. 20, 2018, the contents all of which are incorporated herein by reference.

TECHNICAL FIELD

The present invention relates to a cylindrical battery including a bottomed (=closed-end) cylindrical battery case and a lid, the battery case having an opening doubly wound and tightened to be sealed by an outer peripheral portion of the lid.

BACKGROUND ART

In general, a cylindrical battery is manufactured by housing a power generation element in a bottomed (=closed-end) cylindrical case, and then sealing an opening of the battery case with a lid.

The opening of the battery case is sealed by, for example, crimping an opening-side end portion of the battery case through a gasket.

Furthermore, PTL1 discloses a cylindrical battery in which an opening of a battery case is sealed by doubly winding and tightening an outer peripheral portion of a lid.

CITATION LIST

Patent Literature

PTL 1: Japanese Unexamined Patent Application Publication (Translation of PCT Application) No. 2002-523875

SUMMARY OF THE INVENTION

An outer peripheral surface of a battery case is covered with an insulating outer packaging label in order to prevent a short circuit between a positive electrode and a negative electrode.

In a cylindrical battery in which an opening of a battery case is doubly wound and tightened to be sealed by an outer peripheral portion of a lid, a space portion (gap) is generated between the outer peripheral surface of the battery case and the outer packaging label in a vicinity of the wound and tightened position. Therefore, the outer packaging label in a place having the space portion is subjected to an impact by a sharp product and the like from the outside, the outer packaging label may be broken. Breakage of the outer packaging label causes not only damage of the appearance but also short circuit between the positive electrode and the negative electrode.

The present disclosure has been made in view of the above-mentioned problems, and an object of the present disclosure is to provide a cylindrical battery including a cylindrical battery case and a lid, the battery case having an opening doubly wound and tightened to be sealed by an outer peripheral portion of the lid, wherein even if an outer packaging label covering the outer peripheral surface of the battery case is subjected to an impact from the outside, breakage and the like does not occur.

The cylindrical battery of the present disclosure is a cylindrical battery including a bottomed cylindrical battery case and a lid, the battery case having an opening doubly wound and tightened to be sealed by an outer peripheral portion of the lid, wherein an opening-side outer peripheral portion of the battery case has a diameter reduced inward in the radial direction, an outer peripheral surface of the battery case is covered with an insulating outer packaging label, the opening-side outer peripheral portion of the battery case is provided with a space portion surrounded by the outer peripheral surface of the battery case, the outer peripheral portion of the lid, and the outer packaging label, and the following formula (1) is satisfied in a range of 0.1 mm≤$T_1$≤0.5 mm, where D is a diameter of an inscribed circle that is tangent to the outer peripheral surface of the battery case, the outer peripheral portion of the lid, and the outer packaging label, in a cross section perpendicular to the radial direction of the space portion, and $T_1$ is a thickness of the battery case.

$$1.2 \times T_1 \leq D \leq 2.7 \times T_1 \tag{1}$$

According to the present disclosure, in the cylindrical battery in which the opening of the battery case is doubly wound and tightened to be sealed by the outer peripheral portion of the lid, even if the outer packaging label covering the outer peripheral surface of the battery case is subjected to an impact from the outside, occurrence of breakage and the like can be prevented.

DESCRIPTION OF EMBODIMENTS

Hereinafter, an exemplary embodiment of the present invention will be described with reference to the drawings. Note here that the present invention is not limited to the following exemplary embodiment. Any appropriate modifications can be carried out in a range of the scope in which the advantageous effect of the present invention is exhibited.

Figure 1:
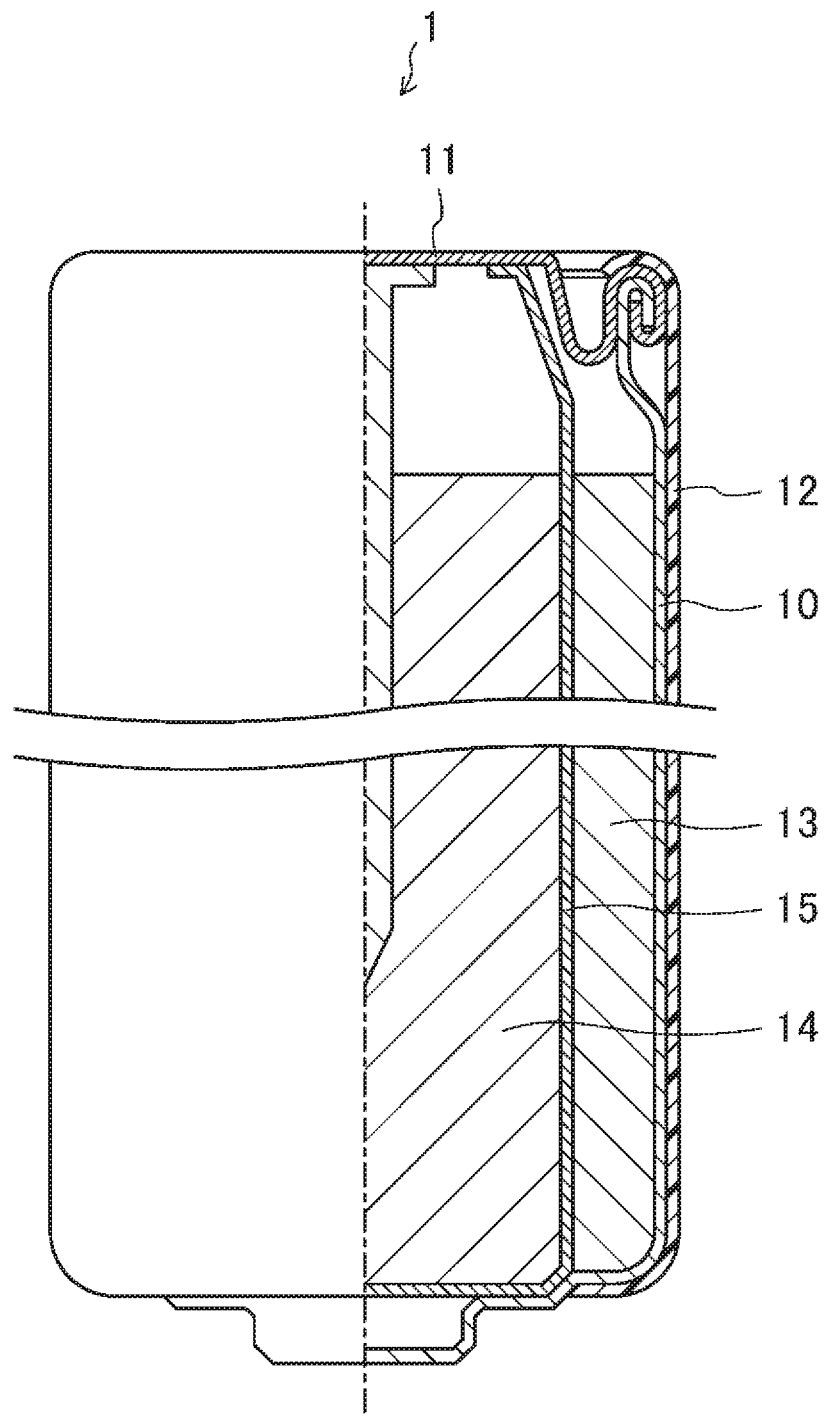
FIG. 1 is a half sectional view schematically showing a configuration of a cylindrical battery in accordance with one exemplary embodiment of the present invention.

FIG. 1 is a half sectional view schematically showing a configuration of a cylindrical battery in accordance with one exemplary embodiment of the present invention. Note here that FIG. 1 shows an example of an alkaline battery, but not limited to this, and can be applied to the other batteries, for example, a lithium primary battery, a lithium ion secondary battery, a nickel hydrogen battery, and the like.

As shown in FIG. 1, in cylindrical battery 1 of this exemplary embodiment, positive electrode 13 including manganese dioxide and negative electrode 14 including a zinc alloy are housed with separator 15 sandwiched therebetween inside bottomed (=closed-end) cylindrical case 10 together with an electrolytic solution. Then, an opening of battery case 10 is sealed by lid 11. Herein, the bottom portion of battery case 10 serves as a positive electrode terminal, and lid 11 serves as a negative electrode terminal.

In this exemplary embodiment, the opening of battery case 10 is doubly wound and tightened to be sealed by an outer peripheral portion of lid 11, and has a so-called doubly wound and tightened structure. Such a doubly winding and tightening can be formed, for example, by winding a curled portion provided to the outer peripheral portion of lid 11 and a flange portion provided to the opening of battery case 10 together in a state in which the curled portion covers the flange portion in advance. Insulation is made by applying a sealing agent between the flange portion and the curled portion.

As shown in FIG. 1, the outer peripheral portion on an opening side of battery case 10 has a diameter reduced inward in the radial direction. Furthermore, the outer peripheral surface of battery case 10 is covered with insulating outer packaging label 12. Note here that outer packaging label 12 covers at least a doubly wound and tightened site of the outer peripheral portion of lid 11. Covering with outer packaging label 12 is carried out, specifically, by winding sheet-like outer packaging label 12 with paste on the inner surface around the outer periphery of the battery, or by putting a battery into tubular outer packaging label 12, then thermally contracting by hot air to allow the label to adhere to the outer peripheral portion of the battery.

Figure 2:
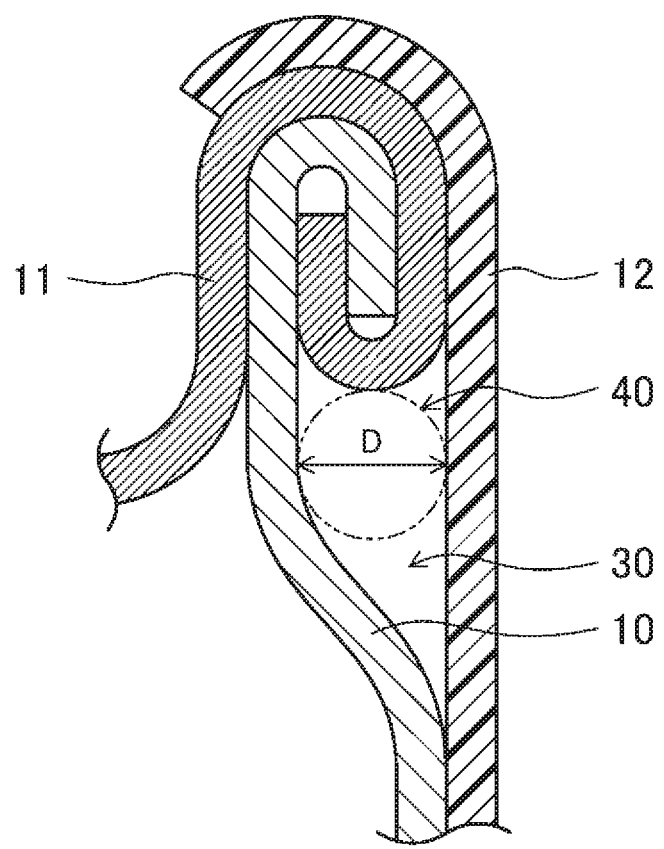
FIG. 2 is an enlarged view enlarging a vicinity of a doubly wound and tightened site in the cylindrical battery shown in FIG. 1.

FIG. 2 is an enlarged view enlarging a vicinity of the doubly wound and tightened site in cylindrical battery 1 shown in FIG. 1.

As shown in FIG. 2, on the outer peripheral portion on the opening side of battery case 10, space portion 30 surrounded by the outer peripheral surface of battery case 10, the outer peripheral portion of lid 11, and outer packaging label 12 is provided. Space portion 30 is formed by reducing the diameter of the outer peripheral portion on the opening side of battery case 10 inward in the radial direction, and by doubly winding and tightening the opening of battery case 10 with the outer peripheral portion of lid 11.

Figure 3A:
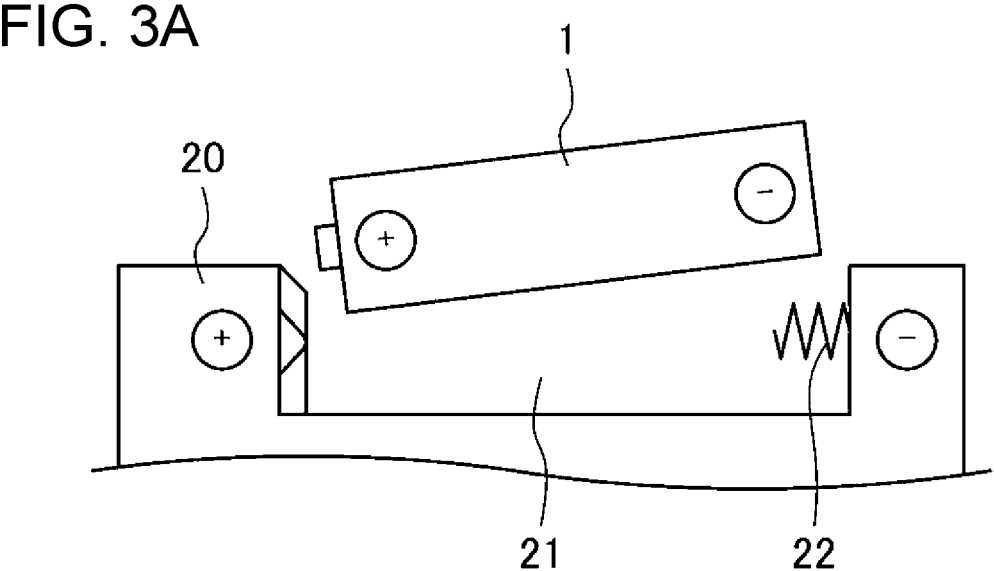
FIG. 3A is a view showing an example of use of the cylindrical battery.

FIG. 3A is a view showing an example of use of cylindrical battery 1. This shows an example in which cylindrical battery 1 is mounted on battery mounting part 21 of electronic device 20. Usually, coil spring 22 is attached to a negative electrode side of battery mounting part 21. In general, battery 1 is mounted so as to push the negative electrode terminal in the direction of contracting coil spring 22, and at this time, the negative electrode terminal side is inserted first. However, in some cases, a user inserts the positive electrode terminal side of battery 1 into the positive electrode side of battery mounting portion 21 first by mistake, and mounts battery 1 in such a manner that a battery side surface is pressed from the circumferential direction of coil spring 22 on the negative electrode terminal side. In such a case, a tip end of coil spring 22 abuts against the side surface of the battery, which may cause breakage of a label, or short circuit at worst.

Figure 3B:
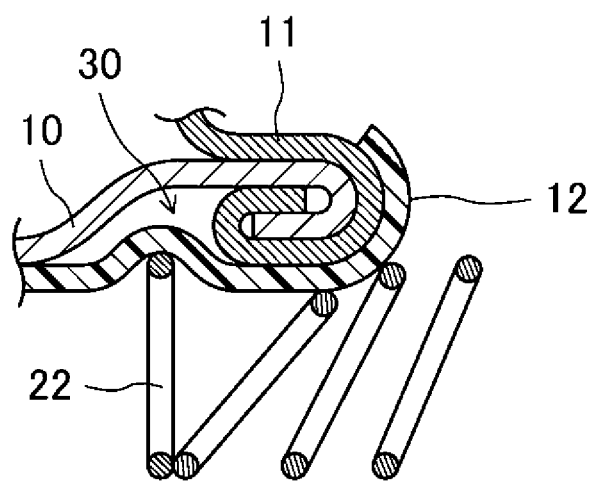
FIG. 3B is a view enlarging a negative electrode terminal side of the battery.

FIG. 3B is a view enlarging the negative electrode terminal side of battery 1. As shown in FIG. 3B, the negative electrode terminal side of battery 1 is a doubly wound and tightened site of battery case 10 and lid 11. Therefore, a tip end portion of coil spring 22 may abut against outer packaging label 12 of the place where space portion 30 is generated as shown in FIG. 2.

When space portion 30 is narrow, the tip end portion of coil spring 22 does not break through outer packaging label 12, but when space portion 30 is wide, the tip end portion of coil spring 22 may break through outer packaging label 12.

As described above, space portion 30 is formed by reducing the diameter of the outer peripheral portion on the opening side of battery case 10 inward in the radial direction, and by doubly winding and tightening the opening of battery case 10 with the outer peripheral portion of lid 11. Therefore, the size of space portion 30 can be controlled to some extent by devising the processing. However, since the processing includes bending, there is limitation to the size of controllable space portion 30 depending on a thickness of battery case 10.

Thus, cylindrical batteries 1 whose thickness of battery case 10 and size of space portion 30 are changed are produced to examine the relation with respect to breakage of outer packaging label 12. Note here that the size of space portion 30 is evaluated based on diameter D of inscribed circle 40 that is tangent to the outer peripheral surface of battery case 10, the outer peripheral portion of lid 11, and outer packaging label 12 in a cross section perpendicular to the radial direction of space portion 30 as shown in FIG. 2. Table 1 shows thicknesses $T_1$ (mm) of battery cases 10 and diameters D (mm) of inscribed circles 40 in produced cylindrical batteries 1. Note here that a thickness of lid 11 is made to be the same as thickness $T_1$ of battery case 10. Furthermore, outer diameter L (mm) of produced cylindrical battery 1 is changed depending on thickness $T_1$ of battery case 10. This is adapted to the actual battery specifications that when thickness $T_1$ of battery case 10 is changed, bending processing accuracy, strength of battery case 10, or the like, are changed, so that the outer diameter of battery 1 is changed depending on thickness $T_1$ of battery case 10.

Note here that thickness $T_1$ of battery case 10 of thinner than 0.1 mm makes the product strength of the battery weak, and therefore is excluded from the evaluation. Similarly, thickness $T_1$ of battery case 10 of larger than 0.5 mm increases the processing strength of double winding and tightening, and therefore is excluded from the evaluation.

Table 1 shows results of evaluation of the degree of breakage of outer packaging label 12 when each of the thus produced batteries 1 is mounted on battery mounting part 21 by the method shown in FIG. 3A. Note here that the size of battery mounting part 21 is changed depending on the size of outer diameter L of battery 1. Furthermore, the diameter of coil spring 22 is also changed depending on the size of outer diameter L of battery 1. This is adapted to the actual device specifications that the diameter of coil spring 22 that supports battery 1 is changed depending on the size of outer diameter L of battery 1.

TABLE 1

| | Outer diameter of battery | Thickness of case | Diameter of inscribed circle | Evaluation results | |
|---|---|---|---|---|---|
| | L (mm) | T₁ (mm) | D (mm) | Breakage of label | Short circuit |
| Battery A1 | 7.5 | 0.10 | 0.38 | 1/10 | 0/10 |
| Battery A2 | 7.5 | 0.10 | 0.28 | 0/10 | 0/10 |
| Battery A3 | 7.5 | 0.10 | 0.11 | 0/10 | 0/10 |
| Battery A4 | 7.5 | 0.10 | 0.06 | Evaluation cannot be performed due to processing limitation. | |
| Battery B1 | 14.0 | 0.20 | 1.05 | 4/10 | 2/10 |
| Battery B2 | 14.0 | 0.20 | 0.64 | 2/10 | 0/10 |
| Battery B3 | 14.0 | 0.20 | 0.55 | 0/10 | 0/10 |
| Battery B4 | 14.0 | 0.20 | 0.40 | 0/10 | 0/10 |
| Battery B5 | 14.0 | 0.20 | 0.22 | 0/10 | 0/10 |
| Battery B6 | 14.0 | 0.20 | 0.15 | Evaluation cannot be performed due to processing limitation. | |
| Battery C1 | 20.0 | 0.30 | 1.30 | 4/10 | 2/10 |
| Battery C2 | 20.0 | 0.30 | 0.95 | 2/10 | 0/10 |
| Battery C3 | 20.0 | 0.30 | 0.83 | 0/10 | 0/10 |
| Battery C4 | 20.0 | 0.30 | 0.58 | 0/10 | 0/10 |
| Battery C5 | 20.0 | 0.30 | 0.33 | 0/10 | 0/10 |
| Battery C6 | 20.0 | 0.30 | 0.27 | Evaluation cannot be performed due to processing limitation. | |
| Battery D1 | 42.0 | 0.40 | 1.60 | 5/10 | 3/10 |
| Battery D2 | 42.0 | 0.40 | 1.18 | 2/10 | 0/10 |
| Battery D3 | 42.0 | 0.40 | 1.10 | 0/10 | 0/10 |
| Battery D4 | 42.0 | 0.40 | 0.75 | 0/10 | 0/10 |
| Battery D5 | 42.0 | 0.40 | 0.45 | 0/10 | 0/10 |
| Battery D6 | 42.0 | 0.40 | 0.38 | Evaluation cannot be performed due to processing limitation. | |
| Battery E1 | 62.0 | 0.50 | 1.45 | 3/10 | 0/10 |
| Battery E2 | 62.0 | 0.50 | 1.38 | 0/10 | 0/10 |
| Battery E3 | 62.0 | 0.50 | 0.89 | 0/10 | 0/10 |
| Battery E4 | 62.0 | 0.50 | 0.56 | 0.10 | 0/10 |
| Battery E5 | 62.0 | 0.50 | 0.51 | Evaluation cannot be performed due to processing limitation. | |

Ten batteries of each battery shown in Table 1 are produced, and evaluation of whether outer packaging label 12 is broken is carried out as follows. Each battery 1 is mounted by the method shown in FIG. 3A, that is, a method of inserting the negative electrode terminal side of battery 1 into the negative electrode (coil spring 22) side of battery mounting part 21 in a state in which the positive terminal side of battery 1 is firstly inserted into the positive electrode side of battery mounting part 21, and a surface state of outer packaging label 12 of battery 1 in this state is observed by visual observation.

Figure 4:
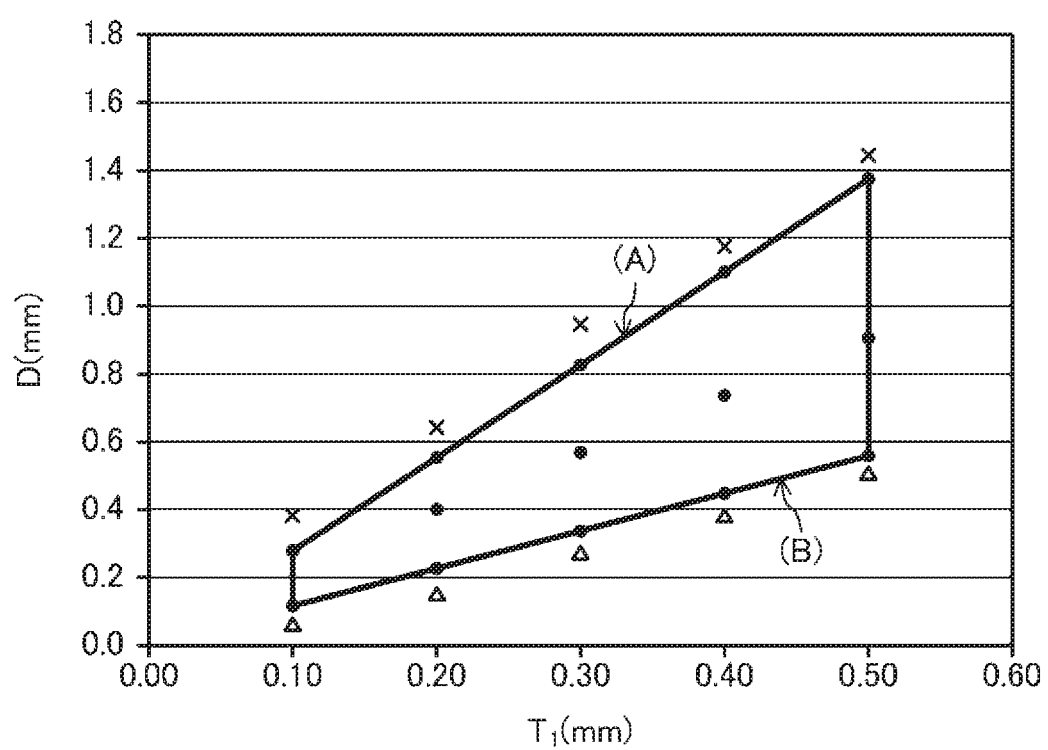
FIG. 4 is a graph showing a situation of an occurrence of breakage of an outer packaging label with respect to thickness T1 of a battery case and diameter D of an inscribed circle.

Table 1 shows the evaluation results thereof, and FIG. 4 shows a situation of an occurrence of breakage of outer packaging label 12 with respect to thickness $T_1$ (mm) of battery case 10, and diameter D (mm) of inscribed circle 40 shown in FIG. 2. Herein, in all of ten batteries, batteries with no breakage of outer packaging label 12 are indicated by black circles, and batteries with at least one breakage of outer packaging label 12 are indicated by cross marks. Note here that the triangular marks indicates that diameter D of the inscribed circle 40 to be formed is in the processing limitation, so that the evaluation cannot be performed.

As shown in FIG. 4, when thickness $T_1$ of battery case 10 is in a range of 0.1 mm≤$T_1$≤0.5 mm, it is shown that thickness $T_1$ of battery case 10 and diameter D of inscribed circle 40 are in the range between a straight line (D=2.7×$T_1$) shown by arrow (A), and a straight line (D=1.2×$T_1$) shown by arrow (B), outer packaging label 12 can be prevented from being broken.

That is to say, outer packaging label 12 can be prevented from being broken, in the range of 0.1 mm≤$T_1$≤0.5 mm when $T_1$ and D are set to satisfy the following formula (1) wherein $T_1$ is a thickness of battery case 10 and D is a diameter of inscribed circle 40.

$$1.2 \times T_1 \leq D \leq 2.7 \times T_1 \tag{1}$$

Note here that when outer packaging label 12 is broken, the positive terminal (battery case 10) and the negative electrode terminal (lid 11) are not immediately short-circuited. However, as shown in Table 1, when diameter D of inscribed circle 40 is further increased, short-circuit may occur. Therefore, in order to prevent short-circuit, it is preferable that $T_1$ and D are set to satisfy the above formula (1).

Furthermore, thickness $T_2$ of lid 11 has little influence on control of the size of space portion 30. Therefore, in this exemplary embodiment, thickness $T_2$ of lid 11 is not particularly limited, but thickness $T_2$ preferably satisfies the following formula in relation to the thickness $T_1$ of battery case 10.

$$0.8 T_1 \leq T_2 \leq 1.2 T_1 \tag{2}$$

When thickness $T_1$ of battery case 10 and thickness $T_2$ of lid 11 satisfy the above formula (2), a difference in the processing strength between battery case 10 and lid 11 becomes small, both components are likely to be doubly wound and tightened uniformly with high balance.

Figure 5:
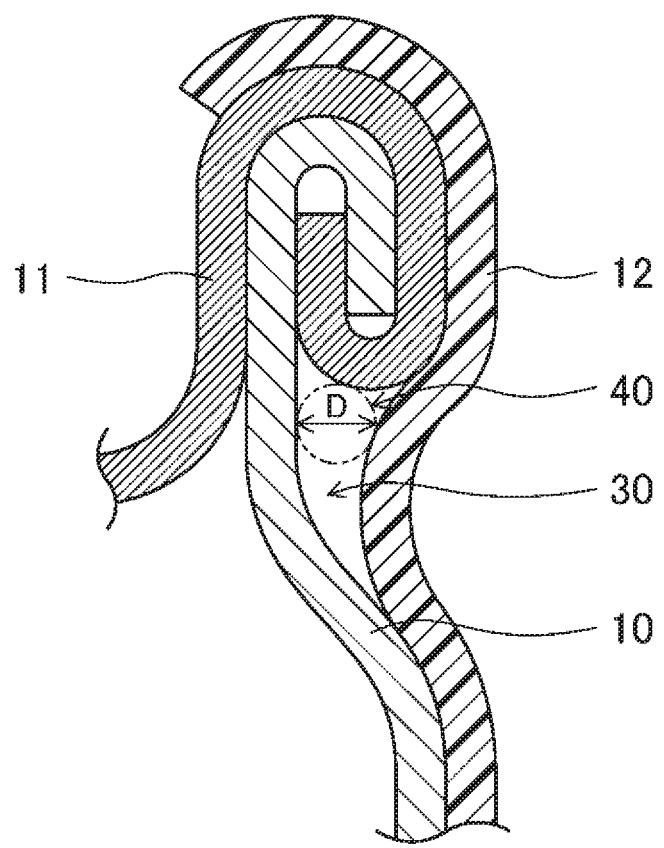
FIG. 5 is an enlarged view enlarging a vicinity of a doubly wound and tightened site in a cylindrical battery in accordance with a modified example of the exemplary embodiment.

FIG. 5 is an enlarged view enlarging a vicinity of a doubly wound and tightened site in a cylindrical battery in accordance with a modified example of the exemplary embodiment.

As shown in FIG. 5, in this modified example, outer packaging label 12 is recessed into the inside of space portion 30 along the shape of outer peripheral surface of battery case 10 and the outer peripheral portion of lid 11. Thus, the diameter D of inscribed circle 40 can be made smaller. In a battery having a doubly wound and tightened structure without having a gasket, a thermal effect on the gasket, which the battery having a crimping structure has, is negligible. Therefore, in covering outer packaging label 12, further heating can promote contraction of outer packaging label 12 and can recess outer packaging label 12 into the inside of space portion 30.

FIGS. 6A to 6F are views of steps showing a method of doubly winding and tightening battery case 10 and lid 11.

Figure 6A:
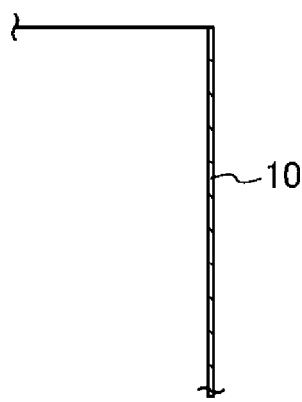
FIGS. 6A to 6F are views of steps showing a method of doubly winding and tightening a battery case and a lid.

Firstly, as shown in FIG. 6A, closed-end cylindrical case 10 is produced by subjecting a metal plate to drawing.

Figure 6D:
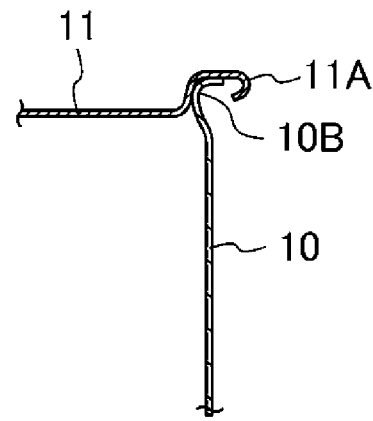
Figure 6B:
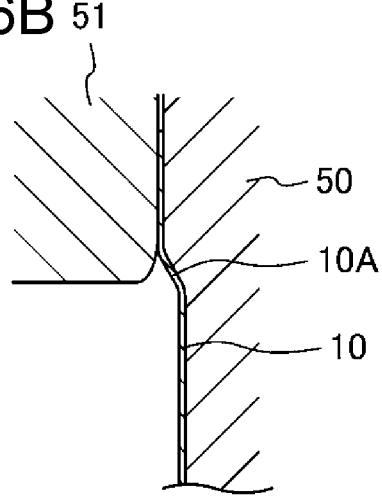

Next, as shown in FIG. 6B, using jigs 50 and 51, outer peripheral portion 10A on the opening side of battery case 10 is reduced inward in the radial direction.

Figure 6E:
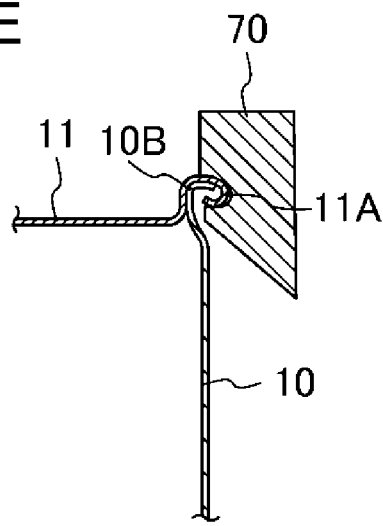
Figure 6C:
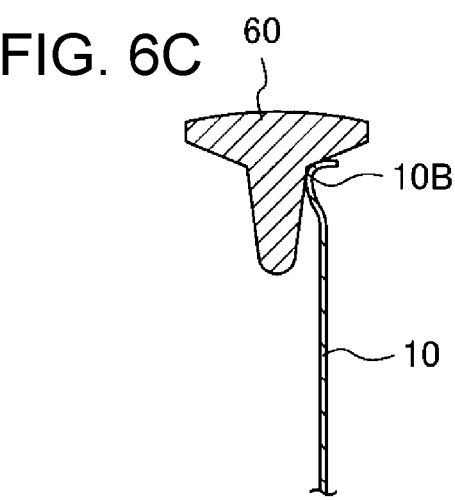

Next, as shown in FIG. 6C, using jig 60, the opening of battery case 10 is subjected to flanging to form flange portion 10B.

Next, as shown in FIG. 6D, lid 11 having curled portion 11A on the outer peripheral portion is disposed such that curled portion 11A covers flange portion 10B of battery case 10.

Figure 6F:
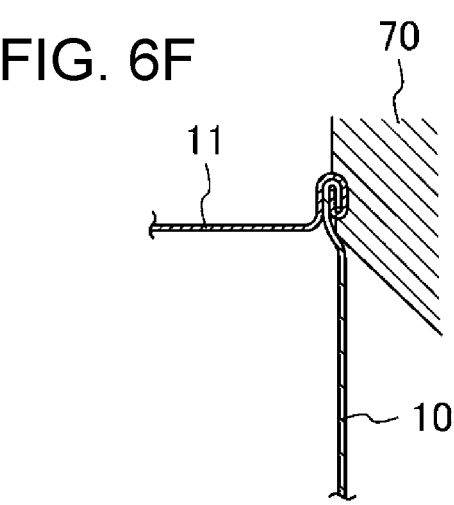

Next, as shown in FIG. 6E, using jig 70, curled portion 11A and flange portion 10B are processed so as to be wound together to complete a doubly wound and tightened structure as shown in FIG. 6F.

The present invention has been described above, by way of the preferable exemplary embodiment, but such description is not limiting and, of course, various modifications are possible.

The invention claimed is:

1. A cylindrical battery comprising a bottomed cylindrical battery case and a lid, the battery case having an opening doubly wound and tightened to be sealed by an outer peripheral portion of the lid,
   wherein an opening-side outer peripheral portion of the battery case has a diameter reduced inward in a radial direction,
   an outer peripheral surface of the battery case is covered with an insulating outer packaging label,
   the opening-side outer peripheral portion of the battery case is provided with a space portion surrounded by the outer peripheral surface of the battery case, the outer peripheral portion of the lid, and the outer packaging label, and
   the following formula (1) is satisfied in a range of 0.1 mm $\leq T_1 \leq$ 0.5 mm, where D is a diameter of an inscribed circle that is tangent to the outer peripheral surface of the battery case, the outer peripheral portion of the lid, and the outer packaging label, in a cross section perpendicular to the radial direction of the space portion, and $T_1$ is a thickness of the battery case:

$$1.2 \times T_1 \leq D \leq 2.7 \times T_1 \quad (1).$$

2. The cylindrical battery according to claim 1, wherein the following formula (2) is satisfied, where $T_2$ is a thickness of the lid:

$$0.8 T_1 \leq T_2 \leq 1.2 T_1 \quad (2).$$

* * * * *